(12) United States Patent  
Kaneko

(10) Patent No.: US 6,549,318 B2  
(45) Date of Patent: Apr. 15, 2003

(54) OPTICAL SCANNER ASSEMBLY

(75) Inventor: Koji Kaneko, Ohmiya (JP)

(73) Assignee: Fuji Photo Optical Co., Ltd. (JP)

( * ) Notice: Subject to any disclaimer, the term of this patent is extended or adjusted under 35 U.S.C. 154(b) by 44 days.

(21) Appl. No.: 09/725,600

(22) Filed: Nov. 29, 2000

(65) Prior Publication Data

US 2001/0040715 A1 Nov. 15, 2001

(30) Foreign Application Priority Data

Nov. 30, 1999  (JP)  ............................................. 11-341157

(51) Int. Cl.⁷ ............................................... G02B 26/08
(52) U.S. Cl. ...................... 359/212; 359/216; 359/196
(58) Field of Search ............................... 359/196–226; 347/242–245, 257–261

(56) References Cited

U.S. PATENT DOCUMENTS

| 4,171,902 A | * 10/1979 | Imai et al. | |
| 5,299,051 A | * 3/1994 | Hirano | 359/216 |
| 6,008,924 A | * 12/1999 | Ikegame | 359/198 |

FOREIGN PATENT DOCUMENTS

| JP | 08194180 | 7/1996 |
| JP | 08244270 | 9/1996 |
| JP | 09197331 | 7/1997 |
| JP | 09318894 | 12/1997 |

OTHER PUBLICATIONS

U.S. application No. 09/725,831, filed Nov. 29, 2000, entitled Optical Scanner Assembly.  
U.S. application No. 10/083,946, filed Feb. 27, 2002, entitled Optical Path Structure of Optical Scanner Assembly.  
U.S. application No. 10/106,180, filed Mar. 26, 2002, entitled Support Structure for Reflectors on Half Rate Carriage.

* cited by examiner

*Primary Examiner*—James Phan  
(74) *Attorney, Agent, or Firm*—Price, Heneveld, Cooper, DeWitt & Litton

(57) ABSTRACT

An optical scanner assembly has optical members divided and arranged on the front and reverse surfaces of a base, thereby reducing the size of the base such that the base can be formed of metal without an increase in cost in order to allow the optical and scanning characteristics to remain stable with time. In one embodiment, a laser light source, a collimator lens, and a cylindrical lens are on the reverse surface of a chassis with reference to mounting references prepared on the reverse surface, while a reflective return mirror, a polygonal mirror, and fθ lenses are mounted on the front surface with reference to mounting references prepared on the front surface.

11 Claims, 6 Drawing Sheets

OPTICAL SCANNER ASSEMBLY

BACKGROUND OF THE INVENTION

1. Field of the Invention

The present invention relates to optical scanner assemblies suitable for use in an imaging system which scans a laser beam across an image carrier such as a photosensitive drum to form an electrostatic latent image on the image carrier and which then transfers a toner image formed of the latent image onto a transfer medium, while the transfer medium is being moved, to form desired images thereon.

2. Description of the Related Art

The optical scanner assembly is used in an imaging system to scan a laser beam across an image carrier while sequentially changing the position of incidence of the light beam. The imaging system allows the laser beam, representative of image information and emitted from a laser light source employed such as in copiers or printers, to be adjusted appropriately and incident upon a deflector means such as a polygonal mirror. Then, the system scans the deflected light beam across the image carrier such as a photosensitive drum to form an electrostatic latent image on the surface thereof. Thereafter, the system allows the electrostatic latent image to be developed with a toner to form a toner image, which is in turn transferred onto a transfer medium such as recording paper. Furthermore, tandem imaging systems are widely known as a color imaging system for use in the color copiers or the color printers. The imaging system is adapted to have a plurality of image carriers such as photosensitive drums in tandem with one another, across each of which a laser beam is scanned to form an electrostatic latent image. The electrostatic latent image is developed with a predetermined toner to form a toner image, which is in turn transferred sequentially onto a transfer medium such as recording paper to form a color image thereon, with the medium being moved in the tandem direction of the image carriers.

A conventional optical scanner assembly of this type, employing a structure in which an optical path from the laser light source to the image carrier is formed generally in the same plane, causes the plane containing the optical path to increase in size, resulting in a large assembly. This requires a wider area for installing the imaging system. For this reason, some optical scanner assemblies are so adapted that a plane containing the optical path of an optical system leading to the deflector means for adjusting the laser light source to scan the laser beam forms an appropriate angle with respect to a plane containing the optical path of the optical system for scanning the laser beam across the image carrier.

For example, an optical scanner assembly, which employs a polygonal mirror as the deflector means, is disclosed in Japanese Patent Laid-Open Publication No. H8-244270. A laser beam emitted from a laser light source 1 (FIG. 10) such as a laser diode passes through a collimator lens 2 and a cylindrical lens 3 to be incident upon a polygonal mirror 4. The polygonal mirror 4 is rotated at an appropriate speed, thus deflecting the laser beam incident thereon. The laser beam reflected by the polygonal mirror 4 passes through an fθ lens 5 to be reflected by a reflector (not shown) and a cylindrical mirror 6, and then reflected by a reflector 7 to be incident upon a photosensitive drum (not shown).

On the other hand, disclosed in Japanese Patent Laid-Open Publication No. H8-194180 is an optical scanner assembly developed in view of the problem that the optical scanner assembly having two fθ lenses, used for scanning laser beams, arranged in a straight line is prevented from being made smaller in size and thus the imaging system employing the optical scanner assembly is also prevented from being made smaller in size. The optical scanner assembly comprises a rotatable polygonal mirror for reflecting a laser beam, an fθ lens having two lens portions integrated vertically, and a reflective means which reflects a laser beam reflected by the rotatable polygonal mirror to pass through one of the lens portions of the fθ lens and which then guides the reflected beam into the other lens portion of the fθ lens. The optical scanner assembly employs the laser beam that passes through the other lens portion as a scan beam.

Also disclosed in Japanese Patent Laid-Open Publication No. H9-318894 is an optical scanner assembly having a structure adapted such that a polygonal mirror deflects and scans a laser beam to allow most of the laser beam to form an image and pass through a half mirror and a scan lens, thereafter the laser beam is returned by a return mirror to be incident upon a rotating drum.

Furthermore, disclosed in Japanese Patent Laid-Open Publication No. H9-197331 is an optical scanner assembly, which is provided with a high degree of flexibility in the layout of components constituting the optical system. The optical scanner assembly comprises a first mirror, interposed between a light source and an optical deflector, for reflecting a light beam toward the optical deflector, and a second mirror interposed between the optical deflector and a scanned body to reflect the light beam toward the scanned body. The optical scanner assembly is adapted such that the first and second mirrors are arranged so that the optical axis of the light beam incident upon the optical deflector is inclined from a direction perpendicular to the rotational axis of the optical deflector toward a sub-scan direction, with the first mirror being located farther away from the optical deflector than the second mirror.

The optical scanner assemblies disclosed in Japanese Patent Laid-Open Publication Nos. H8-244270, 8-194180, and 9-318894 have the layout of the optical path leading from the laser light source to the deflector means substantially in the same plane. This requires a wide area for arranging the optical system leading from the laser light source to the deflector means, leaving the possibility of increasing in size of the optical scanner assembly. In addition, the optical scanner assembly disclosed in the Japanese Patent Laid-Open Publication No. H9-197331 allows a light beam to be inclined from a direction perpendicular to the rotational axis of the polygonal mirror to the sub-scan direction and thus to be incident forwardly upon a reflective surface of the polygonal mirror. However, the laser light source is arranged away from the deflector means to ensure the optical path length from the laser light source to the deflector means. This causes the optical path from the laser light source to the deflector means to spread in a plane, which therefore requires a wide area for accommodating the optical path and thus prevents the optical scanner assembly from being made smaller in size.

The optical members constituting the scan optical system and mounted in position need to remain unchanged to ensure the predetermined optical performance. For this reason, the brackets for mounting the optical members are formed of a metal plate or the like that is resistant to deformation. On the other hand, a faster capability of or use of color in imaging systems such as copiers or printers has required these days a plurality of laser beams or a plurality of units for laser beams. The plurality of laser beams or units makes it inevitable to ensure uniform optical and scanning characteristics of each of the beams or units. Even a slight variation in mounting dimension has an adverse effect on the optical characteristics and the like, leading to the impossibility of maintaining desired characteristics. For this reason, the entire optical system is mounted to a metallic base to allow each of the optical members to remain unchanged in position.

However, the layout of optical members in a plane will cause an increase in size of the base for mounting the entire optical system thereon. Since the metallic base is costly, this will cause an increase in cost of the parts, resulting in an increase in cost of the imaging system into which such optical scanner assembly is incorporated.

SUMMARY OF THE INVENTION

In view of the aforementioned problems, the present invention provides an optical scanner assembly which can be made smaller and allows the optical members of the entire optical system to be mounted on a base such as a metallic base that can maintain the dimension thereof stable to prevent a change in mounting dimension and thus maintain the desired optical and scanning characteristics for a long time.

As technical means to achieve the object, the present invention provides an optical scanner assembly for guiding a light beam emitted from a light source into a deflector means and for allowing the light beam reflected by the deflector means to be incident upon a scanned body to scan the light beam across the scanned body. The optical scanner assembly is characterized in that part of optical members constituting the optical scanner assembly are arranged on one surface of a base having desired performance, and part of or all of the remaining members of the optical members are arranged on the other surface of the base.

The optical members are divided as appropriate to be arranged on the one and the other surfaces of the base. Accordingly, the optical path leading from the light source to the scanned body is formed across the two surfaces of the base. This structure requires a less mounting space when compared with one in which the optical path is arranged in a plane, thereby reducing the optical scanner assembly in size as well as the imaging system in which the optical scanner assembly is incorporated. In addition, since the base can be made small, the parts for the base can be prepared substantially without an increase in cost, thus preventing an increase in cost of the optical scanner assembly.

Furthermore, the optical scanner assembly mentioned above is characterized in that the light source of the optical scanner assembly and optical members of an adjustment optical system for adjusting the light beam emitted from the light source are arranged on the one surface of the base; optical members of a scanning optical system leading from the deflector means to the scanned body are arranged on the other surface of the base; and the light beam having passed through the adjustment optical system is reflected by a reflective return mirror to be guided into the scanning optical system. The optical scanner assembly mentioned above is also characterized in that the light source of the optical scanner assembly and part of the optical members of the adjustment optical system for adjusting the light beam emitted from the light source are arranged on the one surface of the base; the remaining part of the adjustment optical system and the optical members of the scanning optical system leading from the deflector means to the scanned body are arranged on the other surface of the base; and the light beam having passed through part of the adjustment optical system is reflected by the reflective return mirror to be guided into the remaining part of the adjustment optical system.

In one embodiment, a light beam emitted from the light source is adjusted to be suitable for scanning by passing through all of or part of the optical members of the adjustment optical system comprising the collimator lens, the cylindrical lens and the like, and then is incident upon the reflective return mirror. The light beam reflected by the reflective return mirror is incident upon the remaining optical members constituting the adjustment optical system or on the deflector means constituting the scanning optical system to pass through the fθ lens in order to be scanned across the scanned body. These optical members are arranged across the two surfaces of the base, thereby reducing the base in size. One or a plurality of reflective return mirrors may be employed. The optical scanner assembly is also characterized in that the one surface is a front surface of the base and the other surface is the reverse surface of the base. That is, the base is substantially formed in the shape of a plate and the optical members are arranged on the front and reverse surfaces.

Furthermore, the optical scanner assembly is characterized in that a plurality of the light sources are provided, light beams emitted from the plurality of light sources are collimated to be incident upon the deflector means, and light beams reflected by the deflector means are split into a plurality of light beams and each of the light beams is scanned across each scanned body. The optical scanner assembly for use in the color imaging system scans light beams each representative of image data of four colors, that is, yellow (Y), magenta (M), cyan (C), and black (BK), across scanned bodies to form electrostatic latent images. The light sources for emitting the four light beams are arranged on one surface of the base as appropriate, and the light beams are guided into the deflector means provided on the other surface, each being scanned across each of the scanned bodies.

The optical scanner assembly is characterized in that the base is formed of metal. Since the optical members are arranged on the two surfaces of the base, the base can be reduced in size. For this reason, the base can be formed of costly metal without an increase in cost. In addition, the optical members mounted on the base can be maintained under stable conditions, thereby allowing the optical and scanning characteristics to remain in the predetermined state and thus ensuring a stable operation.

In one embodiment, the optical scanner assembly is characterized in that both surfaces of the base have mounting references for mounting the optical members thereon. Optical members to be mounted on one surface are mounted on the surface with reference to the mounting references prepared thereon. Optical members to be mounted on the other surface are mounted on the surface with reference to the mounting references prepared thereon. With optical paths to be formed on the one surface being linked with those to be formed on the other surface by means of appropriate optical link members such as the reflective return mirrors, it is possible to communicate between these optical paths. It is desirable for these optical link members to have an adjustment mechanism for linking these optical paths.

The nature, principle, and utility of the invention will become more apparent from the following detailed description when read in conjunction with the accompanying drawings.

DETAILED DESCRIPTION OF THE EMBODIMENTS

An optical scanner assembly according to the present invention will be specifically explained below in accordance with preferred embodiments illustrated in the accompanying drawings.

Figure 1:
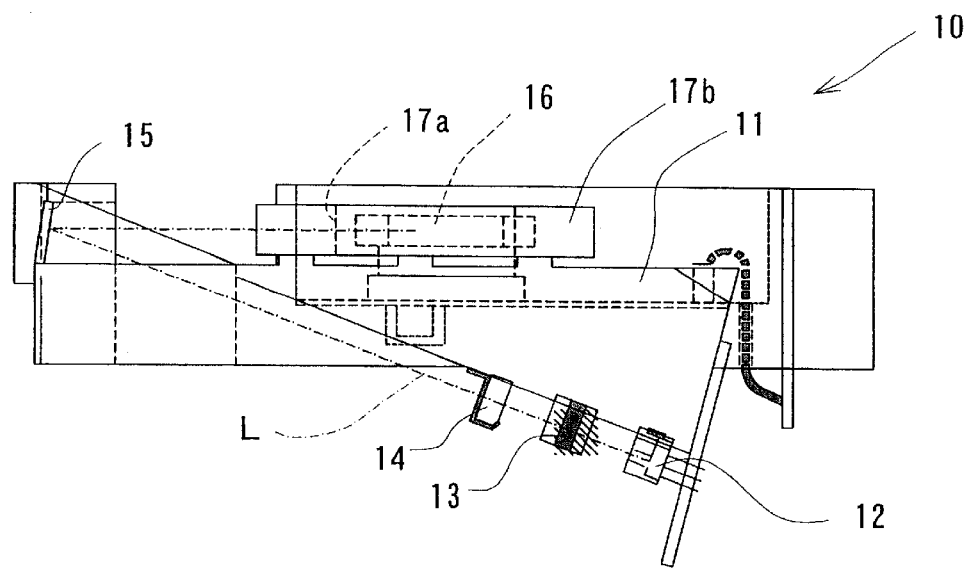
FIG. 1 is a schematic explanatory front view illustrating the structure of an optical scanner assembly according to a first embodiment of the present invention.
Figure 2:
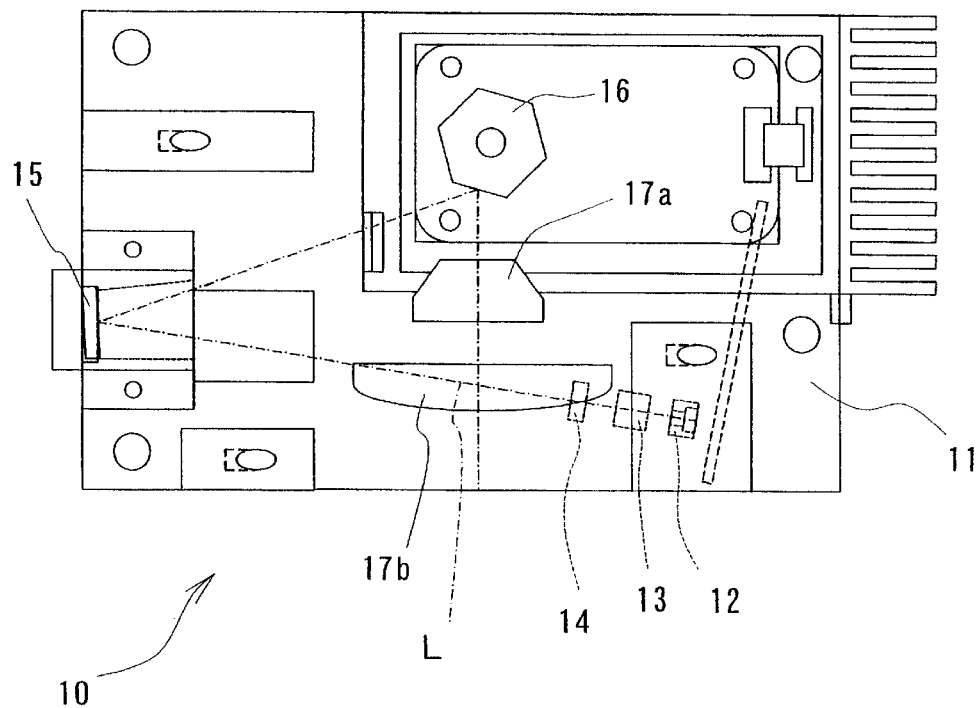
FIG. 2 is a plan view illustrating the optical scanner assembly shown in FIG. 1.

FIGS. 1 and 2 show explanatory views illustrating an optical scanner assembly according to a first embodiment of the present invention. The optical scanner assembly 10 comprises a base or a metallic chassis 11 on which optical members required are mounted. On a portion of the reverse surface of the chassis 11, there is provided a laser light source 12 comprising a laser diode from which a laser beam L is emitted so as to diagonally penetrate the metallic chassis 11. The optical scanner assembly 10 is adapted to allow the laser beam L to reach the surface of the chassis 11 at an edge opposite to the edge where the laser light source 12 is mounted. In front of the laser light source 12 and on the reverse surface of the chassis 11, there are provided a collimator lens 13 and a cylindrical lens 14 to properly size the diameter of the laser beam L. The optical members such as the laser light source 12, collimator lens 13, and cylindrical lens 14 are mounted with reference to mounting references (not shown) provided on the reverse surface of the chassis 11.

There is provided a reflective return mirror 15 at the edge portion on the surface of the chassis 11, where the laser beam L reaches after having passed through the cylindrical lens 14. There is also provided a deflector means or a polygonal mirror 16, which has reflective surfaces formed on the sides of a substantial hexagon and is rotatable at an appropriate speed, on the surface of the chassis 11 and generally at the center of an edge opposite to the edge where the laser light source 12 is provided. The laser beam L reflected by the reflective return mirror 15 is adapted to be incident upon a reflective surface of the polygonal mirror 16 via an optical path in a plane orthogonal to the rotational axis of the polygonal mirror 16. The laser beam L reflected by the reflective surface of the polygonal mirror 16 passes through fθ lenses 17a, 17b, while the direction thereof is being deflected. The fθ lenses 17a, 17b are located on the surface of the chassis 11 and overlap the collimator lens 13 and cylindrical lens 14. Then, the laser beam L is incident upon and is scanned across a scanned body or an image carrier such as a photosensitive drum (not shown) to form an electrostatic latent image thereon. In addition, the reflective return mirror 15, the polygonal mirror 16, and the fθ lenses 17a, 17b are mounted on the surface of the chassis 11 with reference to mounting references (not shown).

The optical scanner assembly 10 according to the first embodiment allows the laser beam L emitted from the laser light source 12 provided on the reverse surface of the chassis 11 to pass through the collimator lens 13 and cylindrical lens 14 sequentially and to be adjusted. Then, the laser beam L travels diagonally with respect to the chassis 11 to reach an edge on the surface of the chassis 11 opposite to the edge where the laser light source 12 is provided, thereafter being incident upon the reflective return mirror 15. The laser beam L reflected by the reflective return mirror 15 is incident upon a reflective surface of the polygonal mirror 16 and is reflected by the polygonal mirror 16 while the reflection direction thereof is being deflected due to the rotation of the polygonal mirror 16. Then, the laser beam L passes through the fθ lenses 17a, 17b and is incident upon and is scanned across an image carrier (not shown).

In addition, the mounting condition of the reflective return mirror 15 is adjusted to allow the laser beam L, emitted from the laser light source 12, passing through the collimator lens 13 and cylindrical lens 14, and incident on the reflective return mirror 15, to pass through an optical path in a plane orthogonal to the optical axis of the polygonal mirror 16. In other words, the reflective return mirror 15 is provided as an optical link member comprising an adjustment mechanism for the laser beam L formed by the optical member provided on the reverse surface to be reflected by the reflective return mirror 15 and incident upon the polygonal mirror 16 through the predetermined optical path.

According to the optical scanner assembly 10 of the first embodiment, there are provided the laser light source 12, the collimator lens 13, and the cylindrical lens 14 on the reverse surface of the chassis 11. On the front surface thereof, there are also provided the reflective return mirror 15, the polygonal mirror 16, and the fθ lenses 17a, 17b. Moreover, part of the optical members are also provided on the opposite side across the chassis 11, thereby making it possible to ensure a sufficient optical path length even with the chassis 11 which is reduced in size. Furthermore, the chassis 11 is formed of a material such as metal capable of maintaining an appropriate rigidity and the optical members are positioned with reference to mounting references (not shown) provided on the front and reverse surfaces of the chassis 11. This prevents a change in the mounting condition of the optical members such as the laser light source 12, the collimator lens 13, the cylindrical lens 14, the reflective return mirror 15, the polygonal mirror 16, and fθ lenses 17a, 17b, thereby allowing the optical scanner assembly 10 to maintain the initial optical and scanning characteristics.

Figure 3:
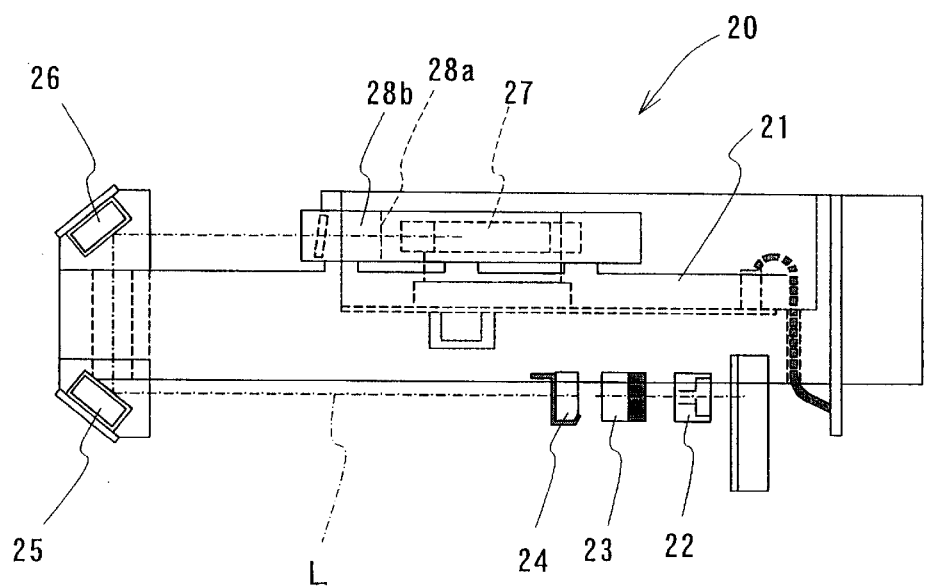
FIG. 3 is a schematic explanatory front view illustrating the structure of an optical scanner assembly according to a second embodiment of the present invention.
Figure 4:
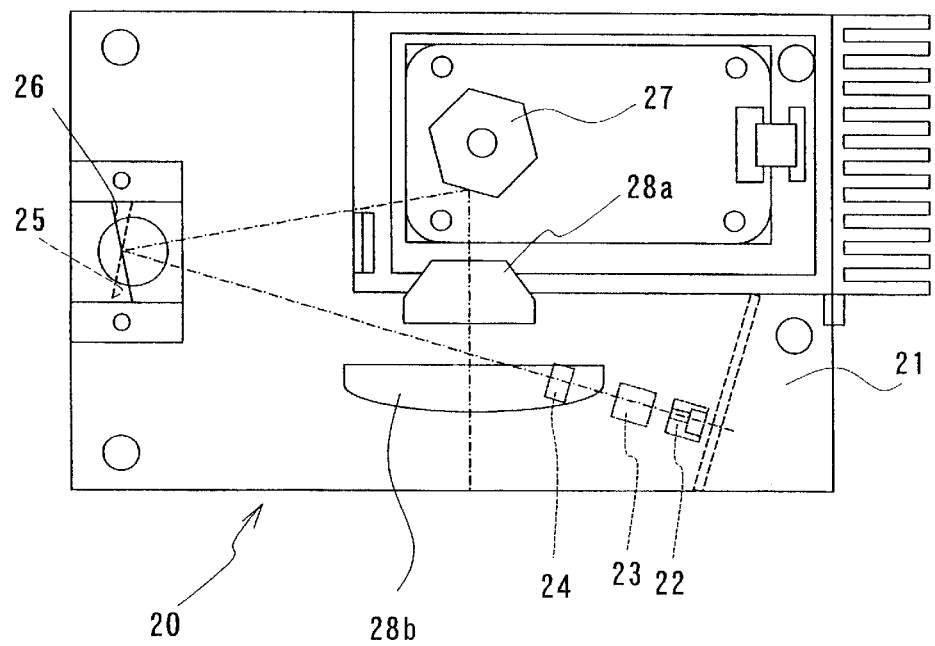
FIG. 4 is a plan view illustrating the optical scanner assembly shown in FIG. 3.

FIGS. 3 and 4 show an optical scanner assembly according to a second embodiment, in which appropriate optical members are mounted on both the front and reverse surfaces of a base or a metallic chassis 21. There is provided a laser light source 22 at a portion of the reverse surface of the chassis 21 and in front thereof, there are provided a collimator lens 23 and a cylindrical lens 24 in that order. The laser beam L emitted from the laser light source 22 travels along the reverse surface of the chassis 21 to pass through the collimator lens 23 and cylindrical lens 24. Then, the laser beam L is incident upon a first reflective return mirror 25 provided on the reverse surface at an edge opposite to the position of the laser light source 22. The optical members such as the laser light source 22, the collimator lens 23, the cylindrical lens 24, and the first reflective return mirror 25 are mounted with reference to mounting references (not show) provided on the reverse surface of the chassis 21.

On the front surface of the chassis 21, there is provided a second reflective return mirror 26 at the position overlapping the first reflective return mirror 25, so that the laser beam L reflected by the first reflective return mirror 25 is adapted to be incident upon the second reflective return mirror 26. Then, the laser beam L reflected by the second reflective return mirror 26 is incident upon a deflector means or a polygonal mirror 27 mounted on the front surface of the chassis 21. The reflected beam from the polygonal mirror 27 passes through fθ lenses 28a, 28b while the direction thereof is being deflected. The fθ lenses 28a, 28b are located on the front surface of the chassis 21 and overlap the collimator lens 23 and cylindrical lens 24. Then, the laser beam L is incident upon a scanned body or an image carrier (not shown) to form an electrostatic latent image on the surface thereof. In addition, the optical members such as the second reflective return mirror 26, the polygonal mirror 27, and the fθ lenses 28a, 28b are mounted on the front surface of the chassis 21 with reference to mounting references (not shown) provided thereon.

The optical scanner assembly 20 according to the second embodiment allows the laser beam L emitted from the laser light source 22 to pass through the collimator lens 23 and cylindrical lens 24 to be adjusted and then incident upon the first reflective return mirror 25. The laser beam L reflected by the first reflective return mirror 25 is incident upon the second reflective return mirror 26 and then is reflected toward the polygonal mirror 27. The laser beam L reflected by the polygonal mirror 27 passes through the fθ lenses 28a, 28b, while the direction thereof is being deflected sequentially, to be incident upon and be scanned across an image carrier such as a photosensitive drum to form an electrostatic latent image thereon.

The laser beam L emitted from the laser light source 22 is guided into the polygonal mirror 27 by adjusting the first reflective return mirror 25 and second reflective return mirror 26. In other words, the first reflective return mirror 25 is adjusted such that the reflected beam L from the first reflective return mirror 25 is incident upon the second reflective return mirror 26 and the reflected beam L from the second reflective return mirror 26 passes through a plane orthogonal to the rotational axis of the polygonal mirror 27. Thus, the first reflective return mirror 25 and the second reflective return mirror 26 are provided as an optical link member comprising an adjustment mechanism for the laser beam L formed by the optical member provided on the reverse surface to be reflected so as to be incident upon the polygonal mirror 27 through the predetermined optical path.

The optical scanner assembly 20 according to the second embodiment can also reduce the size of the chassis 21. Since the chassis 21 is reduced in size, the chassis 21 can be formed of metal without an increase in cost. This also allows each of the optical members to remain in a stable state, thereby maintaining the predetermined optical and scanning characteristics.

Figure 5:
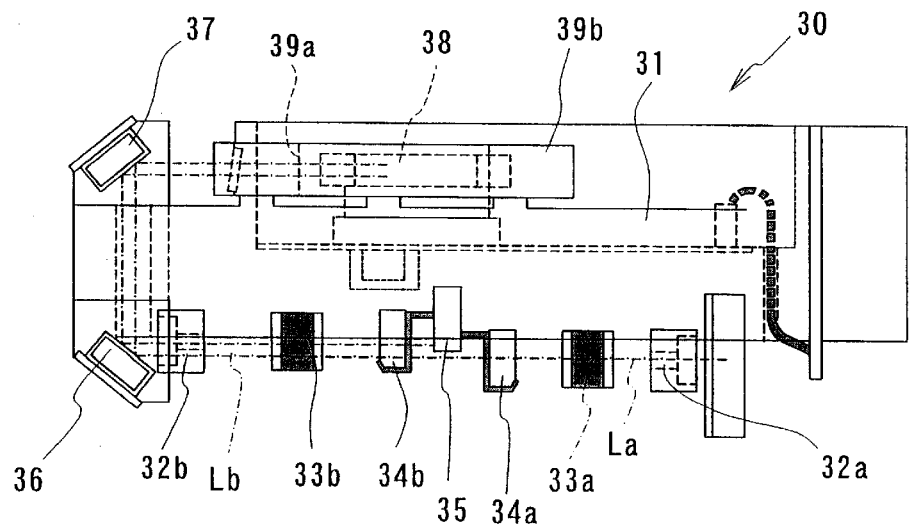
FIG. 5 is a schematic explanatory front view illustrating the structure of an optical scanner assembly according to a third embodiment of the present invention.
Figure 6:
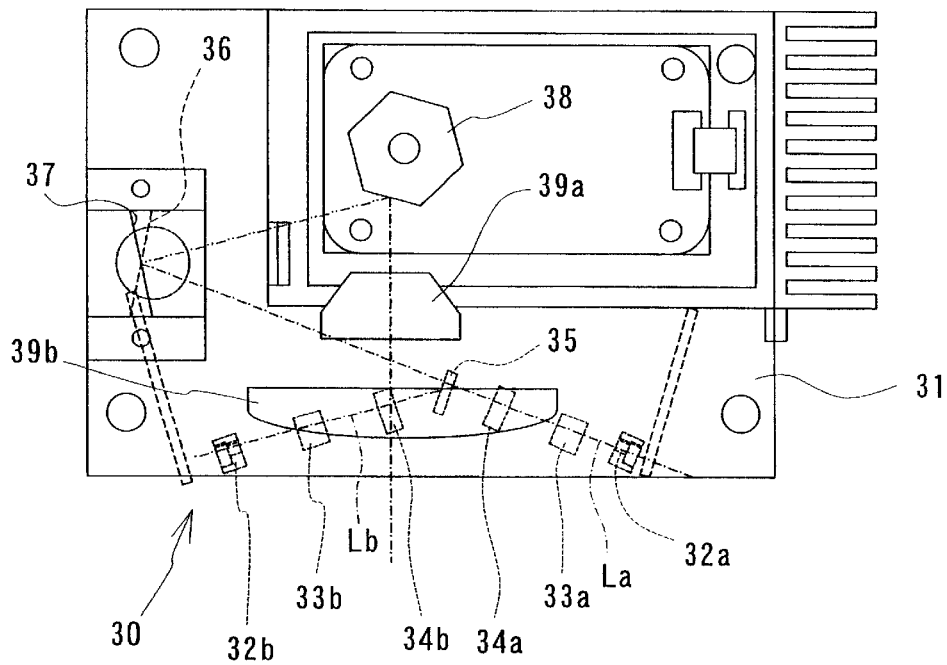
FIG. 6 is a plan view illustrating the optical scanner assembly shown in FIG. 5.

FIGS. 5 and 6 show an optical scanner assembly according to a third embodiment of the present invention, illustrating an optical scanner assembly 30 in which laser beams La, Lb are scanned across scanned bodies separately provided or image carriers (not shown) such as photosensitive drums. On the reverse surface of a base or a metallic chassis 31, there are provided optical members, mounted on the reverse surface with reference to mounting references (not shown) prepared thereon, for forming each of the laser beams La, Lb. The laser beam La is emitted from a laser light source 32a provided at a portion of the reverse surface of the chassis 31 and passes through a collimator lens 33a and a cylindrical lens 34a, then being incident upon a first reflective return mirror 36 arranged on the reverse surface of the chassis 31 and at an edge opposite to the laser light source 32a. On the other hand, the laser beam Lb is emitted from a laser light source 32b provided at a portion opposite to the laser light source 32a and passes through a collimator lens 33b and a cylindrical lens 34b. Then, the laser beam Lb is reflected by a reflector 35 and made parallel to the laser beam La to be incident upon the first reflective return mirror 36.

On the front surface of the chassis 31, there are provided a second reflective return mirror 37, a deflector means or a polygonal mirror 38, and fθ lenses 39a, 39b with reference to mounting references (not shown) provided on the surface. The laser beams La, Lb reflected by the first reflective return mirror 36 are adapted to be incident upon the second reflective return mirror 37 to be reflected toward the polygonal mirror 38 through an optical path in a plane orthogonal to the rotational axis of the polygonal mirror 38. In addition, the laser beams La, Lb reflected by the polygonal mirror 38 passes through the fθ lenses 39a, 39b, while being deflected by the rotation of the polygonal mirror 38, to be incident upon an image carrier or a scanned body such as a photosensitive drum (not shown).

In the optical scanner assembly 30 according to the third embodiment, the first reflective return mirror 36 and second reflective return mirror 37 are adjusted to guide the laser beams La, Lb into the polygonal mirror 38. In other word, the first reflective return mirror 36 and the second reflective return mirror 37 are provided as an optical link member comprising an adjustment mechanism for the laser beams La, Lb formed by the optical members provided on the reverse surface to be reflected so as to be incident upon the polygonal mirror 38, provided on the front surface, through the predetermined optical path. Incidentally, the optical scanner assembly 30 according to the third embodiment has a structure for adjusting the optical path by the two reflective return mirrors 36, 37. However, like the structure of the aforementioned first embodiment, such a structure can also be employed which allows the laser beams La, Lb to be emitted diagonally with respect to the chassis 31 and which is adapted to adjust the optical path by means of a single reflective return mirror provided on the surface of the chassis 31.

The optical scanner assembly 30 according to the third embodiment is also provided with necessary members on the front and reverse surfaces of the chassis 31, thereby making it possible to reduce the size of the chassis 31. Moreover, since the chassis 31 is reduced in size, the chassis 31 can be formed of metal without an increase in cost. This also allows each of the optical members to remain in a stable state, thereby maintaining the predetermined optical and scanning characteristics.

Figure 7:
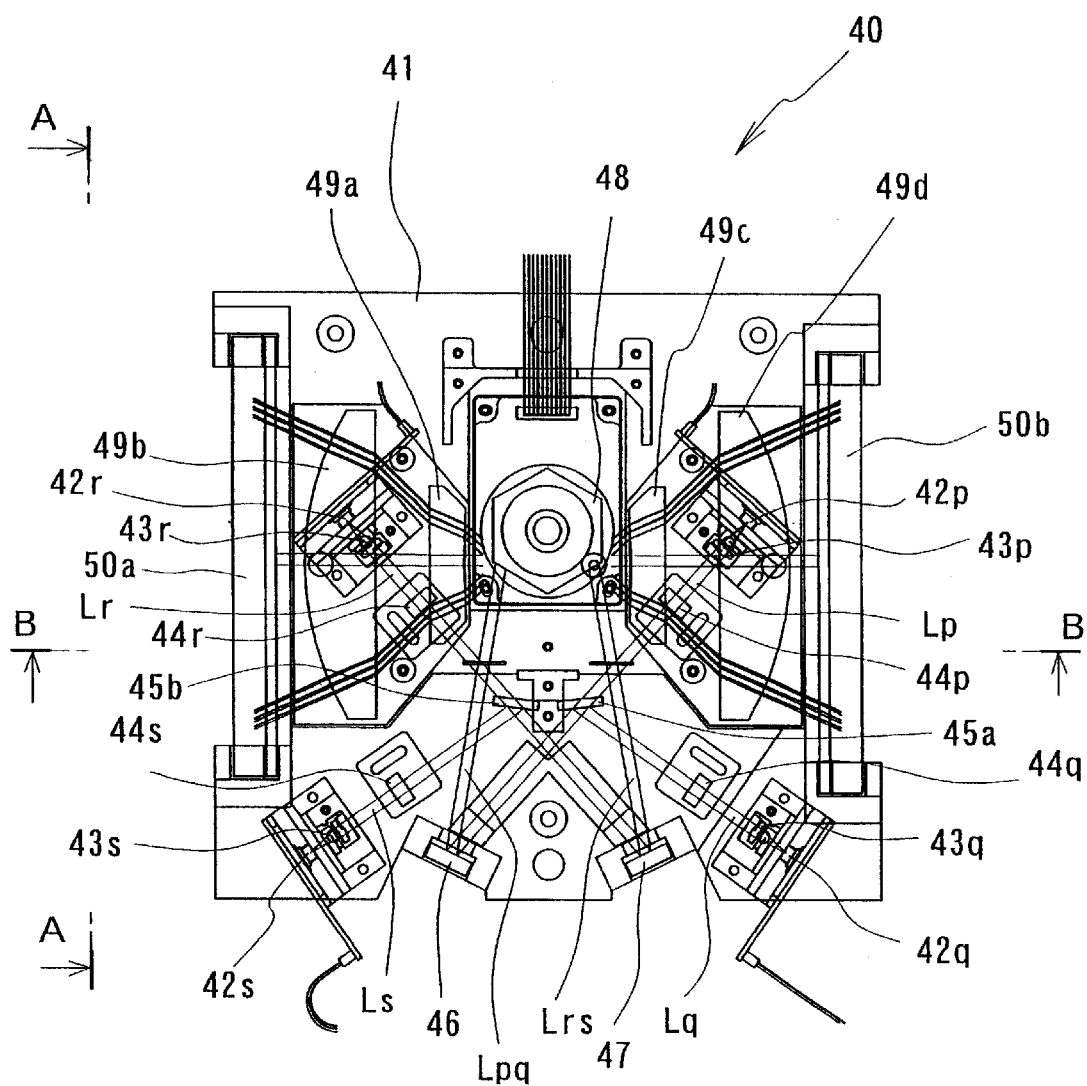
FIG. 7 is a schematic explanatory front view illustrating the structure of an optical scanner assembly according to a fourth embodiment of the present invention.
Figure 8:
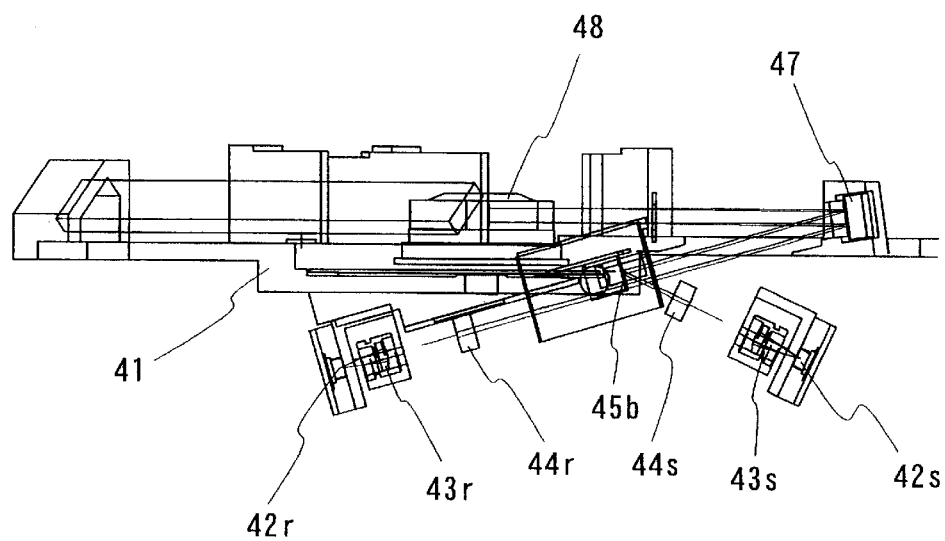
FIG. 8 is a side view illustrating the optical scanner assembly shown in FIG. 7.
Figure 9:
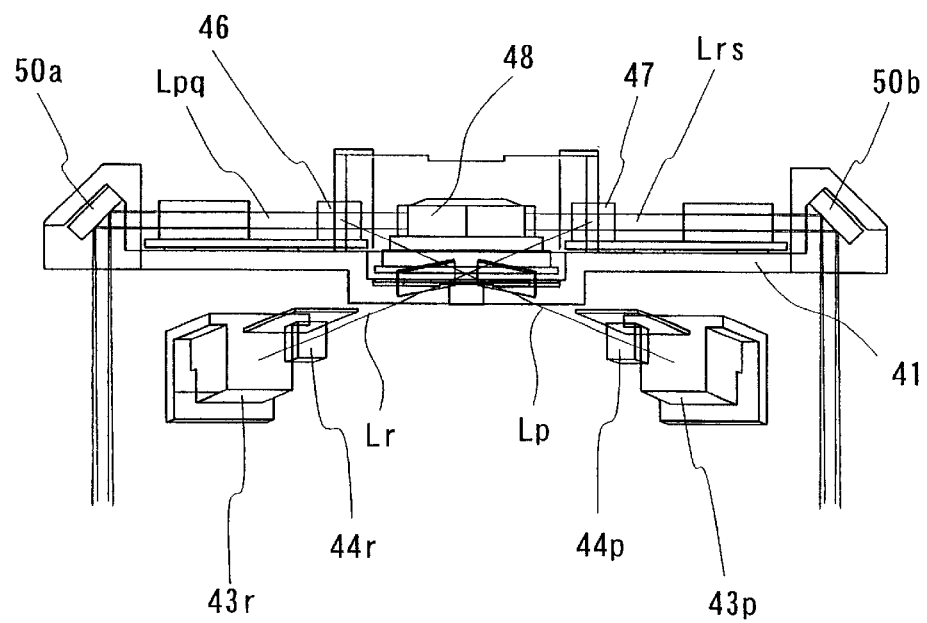
FIG. 9 is a front view illustrating the optical scanner assembly shown in FIG. 7.
Figure 10:
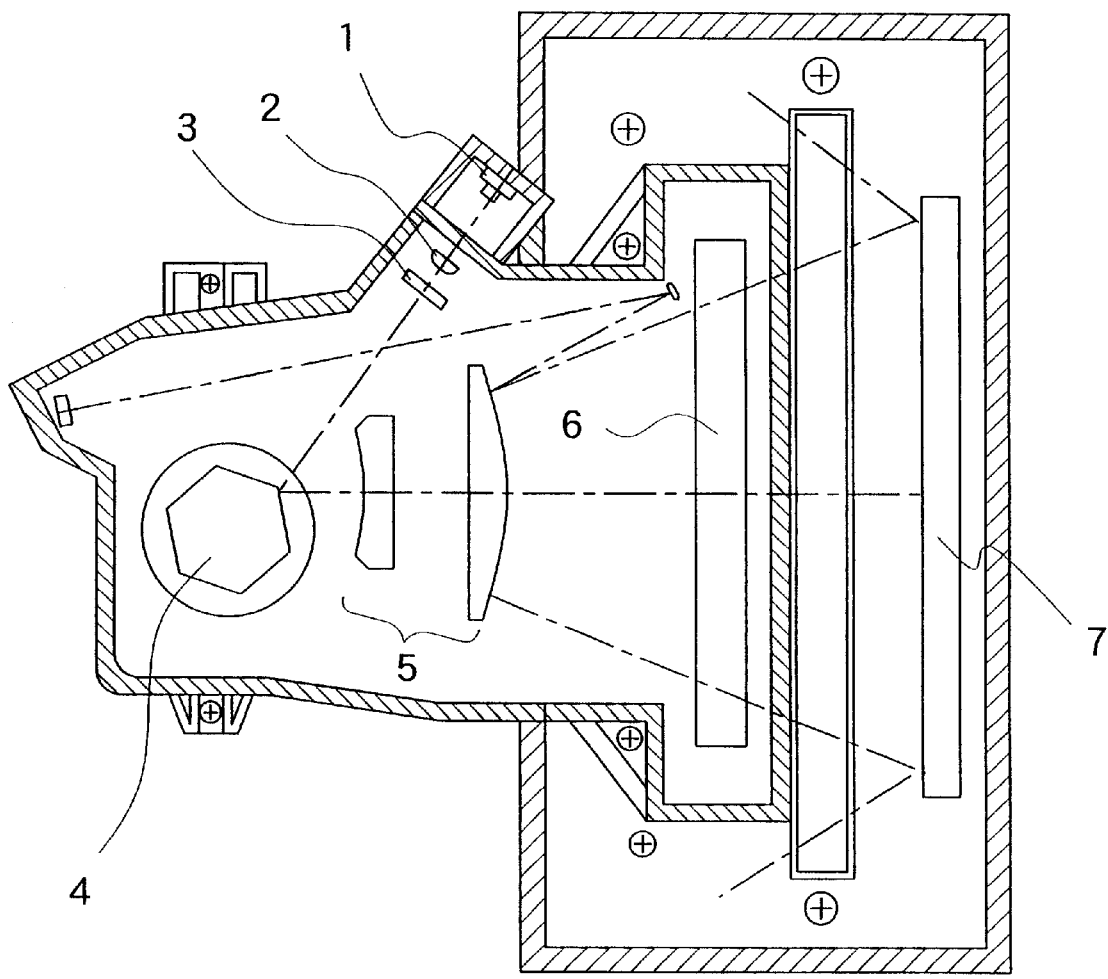
FIG. 10 is a schematic explanatory plan view illustrating the structure of a prior-art optical scanner assembly.

FIGS. 7 to 9 show an optical scanner assembly according to a fourth embodiment of the present invention. The optical scanner assembly 40 according to the fourth embodiment is suitable for color imaging systems such as color copiers and adapted to scan four laser beams Lp, Lq, Lr, Ls corresponding to each of Y, M, C, and BK across four scanned bodies or image carriers such as photosensitive drums (not shown). The optical scanner assembly 40 comprises appropriate optical members mounted on the front and reverse surfaces of a base or a metallic chassis 41.

As shown in FIG. 7, on the reverse surface of the chassis 41, there are provided laser light sources 42p, 42q for emitting the laser beam Lp and laser beam Lq, respectively, along one side rim. In front of the laser light sources 42p, 42q, there are provided collimator lenses 43p, 43q and cylindrical lenses 44p, 44q in that order, through which the laser beams Lp, Lq emitted from the laser light sources 42p, 42q pass. The laser beam Lp from the laser light source 42p is adapted to travel diagonally with respect to the reverse surface of the chassis 41 to be incident upon a reflective return mirror 46 provided on the front surface of the chassis 41 at an edge of the chassis 41. On the other hand, the laser beam Lq emitted from the laser light source 42q passes through the collimator lens 43q and cylindrical lens 44q to be reflected by a reflector 45a. Then, the laser beam Lq is made parallel to the laser beam Lp to be incident upon the reflective return mirror 46. The laser beam Lpq reflected by the reflective return mirror 46 is incident upon a polygonal mirror 48 or a deflector means, pivotably supported generally at the center of the front surface of the chassis 41, through an optical path in a plane orthogonal to the rotational axis of the polygonal mirror 48. The reflected beams from the polygonal mirror 48 are adapted to pass through fθ lenses 49a, 49b, while the direction thereof is being deflected sequentially, and then are incident upon a reflector 50a provided on the front surface of the chassis 41 at an edge opposite to the edge across the polygonal mirror 48, where the laser light sources 42p, 42q are provided.

In addition, at a side rim on the reverse surface of the chassis 41, there are provided laser light sources 42r, 42s, which emit laser beams Lr, Ls. Across the polygonal mirror 48, the side rim is opposite to the side rim where the laser light sources 42p, 42q are provided. The laser beams Lr, Ls are adapted to pass through collimator lenses 43r, 43s and cylindrical lenses 44r, 44s, respectively. The laser beam Lr is incident upon a reflective return mirror 47 provided on the front surface of the chassis 41, while the laser beam Ls is reflected by a reflector 45b and made parallel to the laser beam Lr to be incident upon the reflective return mirror 47. The laser beam Lrs reflected by the reflective return mirror 47 is incident upon the polygonal mirror 48 through an optical path in a plane orthogonal to the rotational axis of the polygonal mirror 48. Moreover, the positions of incidence of the laser beam Lrs and the laser beam Lpq are symmetric with respect to the rotational axis of the polygonal mirror 48. Furthermore, the laser beam Lrs reflected by the polygonal mirror 48 is adapted to pass through fθ lenses 49c, 49d, while the direction thereof is being deflected sequentially, and is incident upon a reflector 50b provided on an edge opposite to the reflector 50a across the polygonal mirror 48.

In addition, each of the optical members to be mounted on the chassis 41 is provided with reference to each of mounting references (not shown) prepared on the front and reverse surfaces of the chassis 41. In other words, the laser light sources 42p, 42q 42r 42s; the collimator lenses 43p, 43q, 43r, 43s; the cylindrical lenses 44p, 44q, 44r, 44s; and reflectors 45a, 45b are provided with reference to mounting references prepared on the reverse surface. On the other hand, the reflective return mirrors 46, 47; the polygonal mirror 48; the fθ lenses 49a, 49b, 49c, 49d; and the reflectors 50a, 50b are provided with reference to mounting references prepared on the front surface.

Furthermore, the reflective return mirrors 46, 47 are adjusted to guide the laser beams LP, Lq, Lr, Ls, emitted from the laser light sources 42p, 42q, 42r, 42s, into the polygonal mirror 48. In other words, the reflective return mirror 46 is adjusted to allow the laser beam Lpq to be incident upon the polygonal mirror 48 via an optical path in a plane orthogonal to the rotational axis of the polygonal mirror 48, while the reflective return mirror 47 is adjusted to allow the laser beam Lrs to be incident upon the polygonal mirror 48 via an optical path in a plane orthogonal to the rotational axis of the polygonal mirror 48. Thus, the reflective return mirrors 46, 47 are provided as an optical link member comprising an adjustment mechanism for the laser beams Lp, Lq, Lr, Ls formed by the optical members provided on the reverse surface to be reflected so as to be incident upon the polygonal mirror 48 through the predetermined optical path.

Still furthermore, the laser beams Lpq, Lrs reflected by the reflectors 50a, 50b each are incident upon a splitter means (not shown) by which the laser beams Lpq, Lrs are each split into the laser beams Lp, Lq and the laser beams Lr, Ls to be incident upon scanned bodies or image carriers such as photosensitive drums (not shown). Incidentally, as the splitter means, it is possible to use, for example, a splitter means which has two reflectors linked to each other to allow the roof-top-shaped outer surfaces to serve as reflective surfaces and allows parallel beams of light to be incident thereon with the top of the splitter means being interposed between the parallel beams in order to split the direction of reflection into two directions.

In the optical scanner assembly 40 according to the fourth embodiment, the laser beams Lp, Lq, Lr, Ls, emitted from each of the laser light sources 42p, 42q, 42r, 42s, pass through the collimator lenses 43p, 42q, 43r, 43s, and the cylindrical lenses 44p, 44q, 44r, 44s. Then, the laser beams Lp, Lr each are incident upon the reflective return mirrors 46, 47, while the laser beams Lq, Ls are each reflected by the reflectors 45a, 45b to be incident upon the reflective return mirrors 46, 47, respectively. The laser beams Lpq, Lrs reflected by the reflective return mirrors 46, 47 are each reflected by the polygonal mirror 48, while the direction thereof being deflected sequentially, and then pass through the fθ lenses 49a, 49b, 49c, 49d to be reflected by the reflectors 50a, 50b. Thereafter, the laser beams Lpq, Lrs are each split into four laser beams by a splitter means (not shown) to be incident upon image carriers (not shown), and are then scanned by the rotation of the polygonal mirror 48 to form electrostatic latent images. Incidentally, the optical scanner assembly 40 according to the fourth embodiment has a structure in which the reflective return mirrors 46, 47 are provided one for each of the laser beams Lpq, Lrs. However, like the aforementioned second and third embodiments, two reflectors may be provided for each laser beam to allow the optical path formed on the reverse surface of the chassis 41 to be substantially parallel to the reverse surface.

According to the optical scanner assembly 40 of the fourth embodiment, even the optical scanner assembly 40 that is incorporated into color imaging systems can be provided with optical members on the front and reverse surfaces of the chassis 41 as appropriate. This makes it possible to reduce the size of the chassis 41, thereby preventing an increase in cost of the chassis 41 even when the chassis 41 is formed of metal. Moreover, the metallic chassis 41 would be readily provided with increased dimensional accuracy to prevent variations from beam to beam, thus allowing the optical and scanning characteristics to remain stable. As described above, the optical scanner assembly according to the present invention allows the optical members to be divided and arranged on the front and reverse surfaces of the base as appropriate, thus the optical members being allowed to sit on overlapping positions. This makes it possible to reduce the size of the base and thus the optical scanner assembly, thus leading to a decrease in size of the imaging system employing the optical scanner assembly. Moreover, since the base can be made smaller, the base can also be formed of metal without an increase in cost. Furthermore, the metallic base will be readily provided with increased dimensional accuracy to prevent variations from beam to beam, thus allowing the optical and scanning characteristics to remain stable.

In addition, the optical scanner assembly according to the present invention having an adjustment optical system and a scanning optical system, which are separated from each other, allows adjustment of these optical systems such as the optical paths to be performed individually, thus facilitating the adjustment. Furthermore, since the reflective return mirrors make it possible to coincide the optical paths with each other in the optical systems, the reflective return mirrors can be adjusted to readily make these optical systems consistent with each other.

Furthermore, according to the optical scanner assembly of the present invention with part of the optical members of the adjustment optical system being separated from the remaining part of the optical members of the adjustment optical system and the scanning optical system, it is made possible to adjust the optical paths by performing individual adjustment on the part of the adjustment optical system and the portion combined between the remaining part of the adjustment optical system and the scanning optical system, the adjustment thus being facilitated. In addition, the reflective return mirrors can be adjusted, thereby allowing the optical paths of these optical systems to be adjusted to be consistent with each other. This facilitates the adjustment of the optical systems to make the optical systems consistent with each other.

Furthermore, according to the optical scanner assembly of the present invention having the one surface employed as the front surface and the other surface employed as the reverse surface, the base can be formed substantially in the shape of a plate to allow optical members to be mounted on the front and reverse surfaces thereof. This makes it possible to reduce the size of the optical scanner assembly and facilitate the preparation of mounting references on the front and reverse surfaces.

In addition, according to the optical scanner assembly of the present invention, which is adapted to scan each of the light beams emitted from a plurality of light sources, the optical scanner assembly can be incorporated into color imaging systems. Furthermore, since the base can be reduced in size, the color imaging system can also be made smaller and the base could be formed of metal without an increase in cost. In addition, this can readily provide a high dimensional accuracy and prevent variations from beam to beam, thereby allowing the optical and scanning characteristics to remain stable.

Furthermore, the optical scanner assembly according to the present invention in which the base is formed of metal allows the predetermined optical and scanning characteristics to remain stable.

Furthermore, according to the optical scanner assembly of the present invention in which the optical members to be provided on each of the surfaces are mounted with reference to the mounting references prepared on the surfaces, predetermined optical characteristics can be provided. Accordingly, the optical members can be individually and readily mounted on each of the surfaces.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical scanner assembly for guiding a light beam emitted from a light source into a deflector means for allowing the light beam reflected by said deflector means to be incident upon a scanned body to scan the light beam across the scanned body, comprising:

a base;

a first group of optical members of said optical scanner assembly arranged on one surface of said base, said group including the light source of said optical scanner assembly and optical members of an adjustment optical system for adjusting the light beam emitted from said light source arranged on said one surface of said base; and the remaining members of said optical members arranged on the other surface of said base, said remaining members including optical members of a scanning optical system leading from said deflector means to said scanned body arranged on said other surface of said base, wherein the light beam having passed through said adjustment optical system is reflected by a reflective return mirror to be guided into said scanning optical system.

2. The optical scanner assembly according to claim 1, wherein said one surface is a front surface of the base and the other surface is the reverse surface of the base.

3. The optical scanner assembly according to claim 2, wherein said base is formed of metal.

4. The optical scanner assembly according to claim 2, wherein both surfaces of said base have mounting references for mounting said optical members thereon.

5. The optical scanner assembly according to claim 1, wherein said base is formed of metal.

6. The optical scanner assembly according to claim 1, wherein both surfaces of said base have mounting references for mounting said optical members thereon.

7. An optical scanner assembly for guiding a light beam emitted from a light source into a deflector means for allowing the light beam reflected by said deflector means to be incident upon a scanned body to scan the light beam across the scanned body, comprising:

a base;

a first group of optical members of said optical scanner assembly arranged on one surface of said base, said group including the light source of said optical scanner assembly and part of optical members of an adjustment optical system for adjusting the light beam emitted from said light source arranged on said one surface of said base; and the remaining part of said adjustment optical system and optical members of a scanning optical assembly leading from said deflector means to said scanned body are arranged on the other surface of said base, wherein the light beam having passed through part of said adjustment optical system is reflected by a reflective return mirror to be guided into the remaining part of said adjustment optical system.

8. The optical scanner assembly according to claim 7, wherein said one surface is a front surface of the base and the other surface is the reverse surface of the base.

9. The optical scanner assembly according to claim 8, wherein both surfaces of said base have mounting references for mounting said optical members thereon.

10. The optical scanner assembly according to claim 7, wherein said base is formed of metal.

11. The optical scanner assembly according to claim 7, wherein both surfaces of said base have mounting references for mounting said optical members thereon.

* * * * *